United States Patent [19]

Eichenauer et al.

[11] Patent Number: 5,668,218

[45] Date of Patent: Sep. 16, 1997

[54] ELASTIC-THERMOPLASTIC GRAFT POLYMERS WITH IMPROVED PROPERTIES

[75] Inventors: Herbert Eichenauer, Dormagen; Martin Bohnenpoll; Adolf Schmidt, both of Köln; Heinrich Alberts, Odenthal, all of Germany

[73] Assignee: Bayer AG, Leverkusen, Germany

[21] Appl. No.: 644,133

[22] Filed: May 10, 1996

[30] Foreign Application Priority Data

May 29, 1995 [DE] Germany .................. 195 19 622.8

[51] Int. Cl.⁶ .............. C08F 279/02; C08F 4/34
[52] U.S. Cl. .............. 525/265; 525/316; 525/315
[58] Field of Search ................ 525/265, 315, 525/316; 568/558

[56] References Cited

U.S. PATENT DOCUMENTS

| | | | |
|---|---|---|---|
| 4,452,737 | 6/1984 | Schmidt et al. | 260/192 |
| 4,476,053 | 10/1984 | Schmidt et al. | 260/192 |
| 5,312,997 | 5/1994 | Bohnenpoll et al. | 568/558 |

FOREIGN PATENT DOCUMENTS

| | | |
|---|---|---|
| 0 065 661 | 12/1982 | European Pat. Off. . |
| 0 282 854 | 9/1988 | European Pat. Off. . |
| 0 375 932 | 7/1990 | European Pat. Off. . |
| 0 569 778 | 11/1993 | European Pat. Off. . |
| 42 15 484 | 11/1993 | Germany . |
| 0164106 | 10/1982 | Japan . |
| 0108411 | 6/1995 | Japan . |
| 0621687 | 8/1978 | U.S.S.R. . |
| 2074591 | 10/1991 | United Kingdom . |

OTHER PUBLICATIONS

Orbit Abstract of EP 0 282 854 (Sep. 21, 1988).
Orbit Abstract of EP 0 569 778 (Nov. 18, 1993).
Orbit Abstract of EP 0 065 661 (Dec. 1, 1982).
Orbit Abstract of DE 42 15 484 (Nov. 18, 1993).

*Primary Examiner*—Irina S. Zemel
*Attorney, Agent, or Firm*—Connolly & Hutz

[57] ABSTRACT

Elastic-thermoplastic graft polymers manufactured by radical emulsion polymerisation of resin-forming vinyl monomers in the presence of rubber present in latex form with the use of a combination of a peroxide of formula (I)

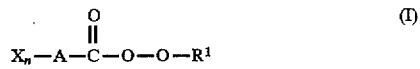

where
$R^1$ signifies alkyl, cycloalkyl and aryl groups with 4 to 20 carbon atoms, X the groups —COOH and —SO$_3$H as well as their alkali, alkaline-earth or ammonium salts, n an integer in the range from 1 to 6, A alkylene, cycloalkylene and arylene groups with 6 to 40 carbon atoms and a reducing agent as initiator system, a method for their manufacture and their use as moulding compositions.

11 Claims, No Drawings

ELASTIC-THERMOPLASTIC GRAFT POLYMERS WITH IMPROVED PROPERTIES

The invention provides elastic-thermoplastic graft polymers which are manufactured by emulsion polymerisation with the use of a special initiator system together with thermoplastic moulding compositions based thereon.

The manufacture of elastic-thermoplastic graft polymers, e.g. of graft polymers from vinyl monomers and rubber by emulsion polymerisation, is known and described in numerous publications, e.g. in EP-A 154 244.

The graft polymerisation is here conventionally initiated by alkali- or ammonium salts of peroxodisulphuric acid or by organic peroxides as radical starters.

If these initiators are used, emulsifiers have to be added during the grafting reaction in order to achieve a sufficiently high latex stability, in particular on swelling of the rubber latex with the graft monomers. In addition to an undesirable swelling, e.g. on the removal of residual monomers by latex degassing after the graft polymerisation has taken place, these emulsifiers lead very often to undesirable properties of the resulting products (e.g. discoloration, reduction in hardness or heat resistance, modification of the flow properties etc.).

It is certainly known in principle to use for emulsion polymerisations azo initiators with surface-active functionalities (cf. EP-A 65 136, EP-A 65 661); these initiators are however difficult to obtain on a commercial scale because of laborious syntheses and moreover azo initiators are suitable to only a limited extent for the carrying out of graft polymerisations (cf. e.g. H. A. J. Battaerd, G. W. Tregaer: Graft Polymers, Wiley Interscience, New York 1970).

The invention provides elastic-thermoplastic graft polymers which are manufactured by radical emulsion polymerisation of resin-forming vinyl monomers in the presence of at least one rubber present in latex form with the use of a combination of a surface-active peroxide compound of the general formula (I)

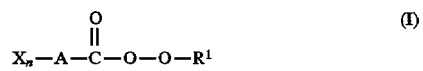

where

R$^1$ signifies alkyl, cycloalkyl and aryl groups with 4 to 20 carbon atoms,

X the groups —COOH and —SO$_3$H as well as their alkali, alkaline-earth or ammonium salts, n an integer in the range from 1 to 6; n preferably stands for the numbers 1 and 2, A alkylene, cycloalkylene and arylene groups with 10 to 40, preferably 10 to 17, carbon atoms, and a reducing agent as initiator system together with moulding compositions based thereon. Graft polymer means here the reaction product of the graft polymerisation, i.e. in general a mixture of the actual graft polymer and free copolymer of the graft monomers.

Compared with the elastic-thermoplastic graft polymers known to date the polymers according to the invention are distinguished by an excellent light shade in the non-coloured state (natural colour) and very high resistance values of thermoplastic moulding compositions of the ABS type based thereon.

There are suitable in principle as rubbers for manufacturing the elastic-thermoplastic graft polymers according to the invention all rubber-type polymers present in emulsion form with a glass transition temperature of less than 0° C. Use can be made e.g. of diene rubbers, i.e. homopolymers of conjugated dienes with 4 to 8 C-atoms such as butadiene, isoprene, chloroprene or their copolymers with up to 60 wt %, preferably up to 30 wt %, of a vinyl monomer, e.g. acrylonitrile, methacrylonitrile, styrene, α-methylstyrene, halogen styrenes, C$_1$–C$_4$-alkyl styrenes, C$_1$–C$_8$-alkyl acrylates, C$_1$–C$_8$-alkyl methacrylates, alkylene glycol diacrylates, alkylene glycol dimethacrylates, divinyl benzene, acrylate rubbers, i.e. homo- and copolymers of C$_1$–C$_{10}$-alkyl acrylates, e.g. homopolymers of ethyl acrylate, butyl acrylate or copolymers with up to 40 wt %, preferably not more than 10 wt %, of mono-vinyl monomers, e.g. styrene, acrylonitrile, vinyl butyl ether, acrylic acid (esters), methacrylic acid (esters), vinyl sulphonic acid. Preferred are acrylate rubber homo- or copolymers which contain 0.01 to 8 wt % of divinyl or polyvinyl compounds and/or N-methylolacrylic amide or N-methylolmethacrylic amide or other compounds which act as crosslinkers, e.g. divinyl benzene, triallyl cyanurate.

Preferred are polybutadiene rubbers, SBR rubbers with up to 30 wt % of internally polymerised styrene and acrylate rubbers, particularly those which have a core-shell structure, e.g. as described in DE-OS 3 006 804.

For the manufacture of the graft polymers according to the invention, lattices with mean particle diameters d$_{50}$ from 0.05 to 2.0 μm, preferably from 0.08 to 1.0 μm and particularly preferably from 0.1 to 0.5 μm are considered. The mean particle diameters are determined by means of ultracentrifuge (cf. W. Scholtan, H. Lange: Kolloid-Z. u.Z. Polymere 250. pp. 782–796 (1972). Mixtures of several latices can likewise be used (cf. DE-OS 1 813 719). These rubber lattices can be manufactured by emulsion polymerisation, the necessary reaction conditions, auxiliaries and working methods are known in principle.

It is also possible to first of all manufacture a finely divided rubber polymer by known methods and then agglomerate it in known manner in order to set the required particle size. Suitable techniques are described (cf. EP-B 0 029 613; EP-B 0 007 810; DD-PS 144 415; DE-AS 1 233 131; DE-AS 1 258 076; DE-OS 2 101 650; U.S. Pat No. 1,379,391).

It is also possible to use the so-called seed polymerisation technique, in which first of all a finely divided polymer, e.g. a butadiene polymer, is manufactured and then further polymerised to larger particles by further reaction with monomers containing butadiene.

In principle rubber polymer lattices can also be manufactured by the emulsifying of finished rubber polymers in aqueous media (cf. Japanese patent application 55 125 102).

There are suitable as graft monomers which are polymerised in the presence of the rubber-type polymers present in emulsion form practically all compounds that can be polymerised in emulsion to thermoplastic resins, e.g. vinyl aromatics of formula (I) or compounds of formula (II) or their mixtures,

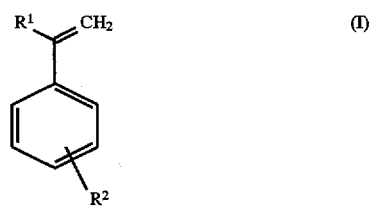

where

R$^1$ represents hydrogen or methyl, $R^2$ hydrogen, halogen or alkyl with 1 to 4 carbon atoms in ortho-, meta- or para-position $R^3$ hydrogen or methyl and X a CN-($\Delta$cyano, $R^4$OOC-($\Delta$ester) or $R^5R^6$NOC-($\Delta$amide) group. $R^4$ here signifies hydrogen or alkyl with 1 to 4 carbon atom, $R^5$ and $R^6$ independently hydrogen, phenyl or alkyl with 1 to 4 carbon atoms.

Examples of compounds of Formula I are styrene, α-methyl-styrene, p-methylstyrene and vinyl toluene. Examples of compounds of Formula II are acrylonitrile and methylmethacrylate. Further suitable monomers are e.g. vinyl acetate and N-phenyl maleiimide.

Preferred monomers are mixtures of styrene and acrylonitrile, α-methylstyrene and acrylonitrile; and of styrene, acrylonitrile and methylmethacrylate as well as combinations of these monomer mixtures with N-phenyl maleiimide.

Preferred graft polymers according to the invention are those that are obtained by the graft polymerisation of styrene and acrylonitrile in the weight ratio 90:10 to 50:50, preferably 80:20 to 65:35 (wherein styrene can be replaced wholly or partly by α-methylstyrene or methylmethacrylate) in the presence of such amounts of rubber, preferably polybutadiene, that graft polymers with rubber contents from 20 to 80 wt %, preferably 30 to 75 wt % and particularly preferably 35 to 70 wt % are obtained.

There are used as surface-active peroxides compounds of the general formula (I), preferably the group A stands for a group with the formula (II)

where the groups $R^2$ and $R^3$ stand for H, $C_1$–$C_{40}$-alkyl, $C_3$–$C_{40}$-cycloalkyl, aryl, aralkyl or halogen, on condition that the sum of the carbon atoms of both groups is greater than 16 or the groups form part of a $C_5$–$C_{10}$-aliphatic or $C_6$–$C_{14}$-aromatic ring system.

Particularly preferred are peroxides (I), where A stands for alkylene, cycloakylene and arylene groups with 10 to 17 carbon atoms.

The peroxides of the general formula (I) are known, their manufacture is described in DE-OS 4 215 484.

Reducing agents useable according to the invention are preferably water-soluble compounds, e.g. salts of sulphinic acids, salts of sulphurous acid, sodium dithionite, sodium sulphite, sodium hyposulphite, sodiumhydrogen sulphite, ascorbic acid and its salts, Rongalit C (sodium formaldehyde sulphoxate), mono- and dihydroxyacetone, sugar (e.g. glucose), iron(II) salts such as iron(II)sulphate, tin(II) salts such as tin(II)chloride, titanium(III) salts such as titanium (III)sulphate. Preferred reducing agents are water-soluble compounds such as e.g. ascorbic acid (salts) or Rongalit. The amounts of peroxide (I) and reducing agent to be used according to the invention are freely selectable, but in general come to 6.05 to 2 parts by wt of peroxide and 0.05 to 1 parts by wt of reducing agent, preferably 0.1 to 1 parts by wt of peroxide and 0.1 to 0.8 parts by wt of reducing agent (referred in each case to 100 parts by wt of monomer); the weight ratio peroxide (I): reducing agent is preferably 10:1 to 1:3, particularly preferably 7:1 to 1:1.

For the manufacture of the elastic-thermoplastic moulding compositions according to the invention the compounds conventionally used as molecular weight regulators can be used, e.g. mercaptans or dimeric α-methylstyrene.

In principle use can also be made, in addition to the surface-active peroxide compound (I), of emulsifiers (anionic, cationic and nonionic emulsifiers), but preferably no additional emulsifier is used.

As reaction temperatures there can be selected the temperatures at which the initiator systems used supply radicals for the starting and maintenance of the polymerisation reaction on a sufficient scale. This temperature range lies roughly from 30° C. to 100° C., preferably from 50° C. to 75° C.

Further subject matter of the invention are thermoplastic moulding compositions containing the elastic-thermoplastic graft polymers manufactured according to the invention.

In order to produce these moulding compositions, the graft polymer is mixed with a matrix resin.

Suitable matrix resins consist e.g. of copolymers of styrene and acrylonitrile in the weight ratio 90:10 to 50:50, wherein the styrene can be replaced wholly or partly by α-methylstyrene or methylmethacrylate and wherein optionally proportionately up to 25 wt %, referred to matrix resin, of a further monomer from the series maleic acid anhydride, maleic- or fumaric acid bisalkyl ester, maleic acid imide, N-(cyclo)-alkyl maleiimide, N-(alkyl)-phenyl maleiimide, or indene can additionally be used.

Details of the manufacture of these resins are described for example in DE-AS 2 420 358, DE-AS 2 724 360 and EP-A 255 889. Matrix resins manufactured by bulk or solution polymerisation have proved particularly effective. For the manufacture of the moulding compositions the graft polymer can be mixed with the matrix resin in various ways. If the matrix resin has been manufactured by emulsion polymerisation, the lattices can be mixed and precipitated jointly or else precipitated separately and the resulting solid substances be mixed.

If the matrix resin is manufactured by solution or bulk polymerisation, the graft polymer must be precipitated separately. Known methods are used for this, for example the addition of salts or acids, after which the precipitation products are washed, dried and optionally convened out of the powder form into a granulate form. There are considered as mixing devices for precipitation products or granulates for example multiple roller mills, Millstruders or internal mixers.

The proportion of the elastic-thermoplastic grafted products according to the invention in the total amount of the moulding compositions according to the invention comes to 10 to 65 wt %, wherein the proportion of the graft polymers is smaller, since not all monomers form grafting branches.

Preferred moulding compositions have the following composition:

| | |
|---|---|
| Grafted product: | 30 to 60 parts by wt |
| Matrix resins: | 70 to 40 parts by wt, | wherein the highest resistances are obtained with proportions of 40 to 60 parts by wt.

There can be added to moulding compositions of the invention during the manufacture, working up, processing and final forming the necessary or appropriate additives, e.g. anti-oxidants, UV stabilizers, peroxide decomposers, antistatics, lubricants, flame retardants, fillers or reinforcing agents (glass fibres, carbon fibres, etc.) and colouring agents.

The final forming can be carried out on commercial processing units and includes e.g. injection moulding, sheet extrusion with optionally subsequent hot forming, cold forming, extrusion of pipes and profiles or calender processing.

The graft polymers manufactured according to the invention can also serve as modifiers for increasing the resistance of individual thermoplastic moulding compositions or those blended from different materials. Examples of modifiable moulding compositions are:

a) Further homo- and mixed polymers of styrene and alkyl-substituted styrene with vinyl-group-containing monomers, e.g. polystyrene, poly(p-methyl)styrene, poly(styrene-co-maleic acid anhydride), poly(styrene-co-acrylonitrile-co-maleic acid-N-phenyl imide), poly(styrene-co-maleic acid-N-phenyl imide), b) homo- and mixed polymers of $C_1$–$C_4$-alkyl(meth)acrylates with vinyl-group-containing monomers, e.g. polymethyl-methacrylate, poly(methylmethacrylate-co-styrene), poly(methylmethacrylate)-co-maleic acid anhydride), poly(methylmethacrylate-co-styrene-co-maleic acid anhydride), c) halogen-containing polymers, e.g. polyvinyl chloride, polyvinylidene chloride, chlorinated polyethylene, d) polycarbonates, e.g. based on bisphenol A, 1,1-bis-(4-hydroxyphenyl)-3,3,5-trimethylcyclohexane, tetramethylbisphenol A, tetrabromobisphenol A, e) polyesters, e.g. based on terephthalic acid, isophthalic acid, ethylene glycol, butanediol, f) polyamides, e.g. based on ε-caprolactam, laurinlactam, adipic acid/hexamethylenediamine.

Moreover the graft polymers manufactured according to the invention are used in amounts of 1 to 80, preferably 5 to 50 wt %, referred to the total moulding composition.

In the following examples parts are always parts by weight and % always wt %, unless stated otherwise.

EXAMPLES AND COMPARATIVE EXAMPLES

Example 1

55 parts by wt (calculated as solid) of an anionically emulsified polybutadiene latex manufactured by radical polymerisation with a $d_{50}$ value of approx. 443 nm were brought with water to a solids content of approx. 20 wt %, mixed with 0.125 parts by wt of the reaction product from octadecenylsuccinic acid anhydride and tert.-butylhydroperoxide in the form of the liquid described in U.S. Pat. No. 5,312,997, Example 14, and heated to 63° C. After this a) 45 parts by wt of a mixture of 73 wt % styrene and 27 wt % acrylonitrile, b) 0.125 parts by wt of the reaction product described above and c) 0.05 parts by wt of sodium ascorbate (in the form of a 0.5% aqueous solution)

were added in parallel within 4 hours. After a 4-hour post-reaction time the graft latex was coagulated after the addition of approx. 1.0 parts by wt of a phenolic antioxidant with a magnesium sulphate/acetic acid mixture and after washing with water the resulting powder was vacuum-dried at 70° C.

Example 2

Example 1 was repeated, wherein the amounts of reaction product from octadecenyl-succinic acid anhydride and tert.-butylhydroperoxide were each doubled in the receiver and in the inflow and the amount of sodium ascorbate was also doubled.

Example 3

(comparison)

Example 1 was repeated, wherein instead of the reaction peroxide described above tert.-butylhydroperoxide was used. The latex could not be worked up, since it coagulated in the course of the reaction.

Example 4

(comparison)

Example 3 was repeated, wherein, in parallel with the other influents, 1 part by wt (calculated as solid substance) of the sodium salt of an oleoresin acid mixture ((Dresinate 731, dissolved in alkaline water) was additionally added.

Example 5

(comparison)

Example 1 was repeated, wherein, instead of the reaction product described above and the sodium ascorbate solution, 0.25 parts by wt of $K_2S_2O_8$ (in the form of a 1.64% aqueous solution, added to the receiver) were used. The latex contained on completion of the reaction a high mount of coagulate (approx. 4.8 wt %, referred to total solids), but could still be worked up.

Example 6

40 parts by wt (calculated as solid) of an anionically emulsified polybutadiene latex manufactured by radical polymerisation with a $d_{50}$ value of approx. 277 nm were brought with water to a solids content of approx. 20 wt %, mixed with 0.125 parts by wt of the reaction product described in Example 1 and heated to 63° C. After this a) 60 parts by wt of a mixture of 73 wt % styrene and 27 wt % acrylonitrile, b) 0.25 parts by wt of the reaction product described above and c) 0.10 parts by wt of sodium ascorbate (in the form of a 0.5% aqueous solution)

were added in parallel within 4 hours. After a 4-hour post-reaction time working up as per Example 1 took place.

Example 7

(comparison)

Example 6 was repeated, wherein instead of the reaction product described above and the sodium ascorbate solution, 0.5 parts by wt of $K_2S_2O_8$ (in the form of a 1.64% aqueous solution, added to the receiver) were used. In addition there were added in parallel with the other influents within 4 hours 1 part by wt (calculated as solid substance) of the sodium salt of an oleoresin acid mixture (Dresinate 731, dissolved in alkaline water).

Testing of the graft polymers 40 parts by wt of graft polymer were mixed in an internal mixer with 60 parts by wt of a styrene/acrylonitrile copolymer resin (72:28, $\overline{M}_w \approx 115\,00$, $\overline{M}_w/\overline{M}_n - 1 \leq 2$), 2 parts by wt of ethylenediamine bisstearyl amide and 0.1 parts by wt of a silicone oil and then extruded into test rods. There were determined the notch impact strength $a_k$ to ISO 180/1A (unit: $kJ/m^2$), the ball-puncture resistance $H_c$ to DIN 53 456 (unit: $N/mm^2$), the heat resistance (Vicat B) to DIN 53 460 (unit: °C.), and the raw colour (visual evaluation according to the classes

| | |
|---|---|
| — | very dark |
| - | dark |
| o | average |
| + | light |
| ++ | very light |

The test data obtained for the moulding compositions manufactured with the use of the graft polymers described are given in Table 1. It can be seen from them that the graft polymers according to the invention lead to moulding compositions with clearly improved resistance and lighter natural colour, while at the same time maintaining the other properties.

TABLE I test data of the moulding compositions

| Graft polymer from example | $a_k$ (kJ/m²) | $H_c$ (N/mm²) | Vicat B (°C.) | Natural colour |
|---|---|---|---|---|
| 1 | 47 | 72 | 99 | ++ |
| 2 | 50 | 72 | 99 | ++ |
| 3 (comparison) | — | — | — | — |
| 4 (comparison) | 43 | 71 | 98 | o |
| 5 (comparison) | 39 | 86 | 99 | – |
| 6 | 35 | 97 | 102 | ++ |
| 7 (comparison) | 30 | 97 | 103 | — |

We claim:

1. Elastic-thermoplastic graft polymers manufactured by radical emulsion polymerisation of resin-forming vinyl monomers in the presence of rubber present in latex form with the use of a combination of a peroxide of formula (I)

where is an alkyl, cycloalkyl or aryl group with 4 to 20 carbon atoms,

X is a —COOH group or a —SO₃H group or their alkali, alkaline-earth or ammonium salts, n is an integer in the range from 1 to 6, A is an alkylene, cycloalkylene or arylene group with 6 to 40 carbon atoms and a reducing agent as initiator system, wherein said reducing agent is a compound selected from the group consisting of salts of sulphinic acids, salts of sulphurous acid, sodium dithionite, sodium sulphite, sodium hyposulphite, sodiumhydrogen sulphite, ascorbic acid and its salts, sodium formaldehyde sulphoxate, mono- and dihydroxyacetone, sugar, iron(II) salts, tin(II) salts and titanium(III) salts.

2. Elastic-thermoplastic graft polymers according to claim 1, wherein said resin-forming vinyl monomers are selected from the group consisting of styrene, α-methylstyrene, acrylonitrile, methylmethacrylate, N-phenyl maleiimide and mixtures thereof.

3. Elastic thermoplastic graft polymers according to claim 1, wherein said rubber contains butadiene.

4. Elastic-thermoplastic graft polymers according to claim 1, wherein group A in formula (I) has the formula (II)

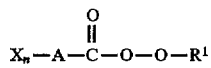

wherein the groups R² and R³ stand for H, C₁–C₄₀-alkyl, C₃–C₄₀-cycloalkyl, aryl, aralkyl or halogen, on condition that the sum of the carbon atoms of both of groups R² and R³ is greater than 16 or groups R² and R³ form part of a C₅–C₁₀-aliphatic or C₆–C₁₄-aromatic ring system.

5. Elastic-thermoplastic graft polymers according to claim 1, wherein in formula (I) A is an alkylene, cycloalkylene or arylene group with 10 to 17 carbon atoms.

6. Method for manufacturing the elastic-thermoplastic graft polymers of claim 1, wherein resin-forming vinyl monomers are polymerised by radical emulsion polymerisation in the presence of a rubber latex, further wherein a combination of a peroxide of formula (I) and said reducing agent is used as said initiator system.

7. Elastic-thermoplastic graft polymers according to claim 1, wherein said reducing agent is a compound selected from the group consisting of ascorbic acid, salts of ascorbic acid and sodium formaldehyde sulphoxate.

8. Elastic-thermoplastic graft polymers according to claim 1, wherein said sugar is glucose.

9. Elastic-thermoplastic graft polymers according to claim 1, wherein said iron(II) salts is iron(II) sulphate.

10. Elastic-thermoplastic graft polymers according to claim 1, wherein said tin(II) salts is tin(II) chloride.

11. Elastic-thermoplastic graft polymers according to claim 1, wherein said titanium(III) salts is titanium(III) sulphate.

* * * * *

UNITED STATES PATENT AND TRADEMARK OFFICE
CERTIFICATE OF CORRECTION

PATENT NO. : 5,668,218
DATED : September 16, 1997
INVENTOR(S) : Eichenauer, et al It is certified that error appears in the above-identified patent and that said Letters Patent is hereby corrected as shown below:

In Column 7, line 39 (Claim 1), "$R^1$" should be inserted before "is an alkyl,".

Signed and Sealed this

Third Day of February, 1998

Attest:

BRUCE LEHMAN

Attesting Officer

Commissioner of Patents and Trademarks